(12) United States Patent
Sircar et al.

(10) Patent No.: US 6,468,328 B2
(45) Date of Patent: Oct. 22, 2002

(54) OXYGEN PRODUCTION BY ADSORPTION

(75) Inventors: Shivaji Sircar, Wescosville; William Emil Waldron, Whitehall, both of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 2 days.

(21) Appl. No.: 09/739,150

(22) Filed: Dec. 18, 2000

(65) Prior Publication Data

US 2002/0108494 A1 Aug. 15, 2002

(51) Int. Cl.7 .............................................. B01D 53/047
(52) U.S. Cl. ............................ 95/101; 95/102; 95/130; 95/902; 96/130; 96/144
(58) Field of Search ........................... 95/98, 101, 102, 95/105, 130, 902; 96/130, 143, 144

(56) References Cited

U.S. PATENT DOCUMENTS

| | | | |
|---|---|---|---|
| 4,329,158 A | | 5/1982 | Sircar .......................... 55/26 |
| 4,449,990 A | * | 5/1984 | Tedford, Jr. ............... 95/102 X |
| 4,684,377 A | * | 8/1987 | Haruna et al. ............. 95/130 X |
| 4,762,537 A | * | 8/1988 | Fleming et al. ............ 95/902 X |
| 4,810,265 A | * | 3/1989 | Lagree et al. .............. 95/902 X |
| 5,074,892 A | * | 12/1991 | Leavitt ...................... 95/130 X |
| 5,203,887 A | * | 4/1993 | Toussaint ................... 95/130 X |
| 5,292,360 A | * | 3/1994 | Pacaud et al. .............. 95/902 X |
| 5,429,666 A | * | 7/1995 | Agrawal et al. ........... 95/102 X |
| 5,529,610 A | * | 6/1996 | Watson et al. ............. 95/130 X |
| 5,540,758 A | * | 7/1996 | Agrawal et al. ........... 95/102 X |
| 5,779,767 A | * | 7/1998 | Golden et al. ............. 95/902 X |
| 5,882,380 A | | 3/1999 | Sircar ............................ 95/98 |
| 5,962,358 A | * | 10/1999 | Hees et al. ................. 95/130 X |
| 5,997,611 A | * | 12/1999 | Doong et al. .................. 95/101 |
| 6,048,509 A | * | 4/2000 | Kawai et al. ................. 95/98 X |
| 6,096,115 A | * | 8/2000 | Kleinberg et al. ......... 95/130 X |
| 6,152,991 A | * | 11/2000 | Ackley ....................... 95/130 X |
| 6,284,021 B1 | * | 9/2001 | Lu et al. ..................... 95/102 X |

FOREIGN PATENT DOCUMENTS

EP 0963777 A2 12/1999 ......... B01D/53/047

* cited by examiner

*Primary Examiner*—Robert H. Spitzer
(74) *Attorney, Agent, or Firm*—Geoffrey L. Chase

(57) ABSTRACT

A process for producing an oxygen enriched product includes: (a) providing a gas separation apparatus having at least one bed containing a mixture of at least two different nitrogen selective adsorbents, wherein the at least one bed is free of lithium cations; (b) feeding a feed gas containing oxygen and nitrogen into the gas separation apparatus to contact the at least one bed; and (c) recovering from the gas separation apparatus the oxygen enriched product. The process is preferably performed above ambient temperature and/or in a simplified four-step cycle. The cycle includes: (a) feeding a feed gas containing oxygen into a gas separation apparatus to contact at least one bed of the apparatus with the feed gas, wherein the feed gas is at a temperature above ambient; (b) countercurrently evacuating the at least one bed following the feeding; (c) countercurrently purging the at least one bed with the oxygen enriched product under vacuum; and (d) simultaneously pressurizing the at least one bed with a countercurrent stream of the oxygen enriched product and a cocurrent stream of the feed gas.

17 Claims, 2 Drawing Sheets

OXYGEN PRODUCTION BY ADSORPTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates generally to the separation of oxygen from gas mixtures, such as air. More particularly, the invention relates to the use of mixed adsorbents in the adsorber, a higher air feed temperature, and/or a simpler vacuum swing adsorption/pressure swing adsorption (VSA/PSA) process design to separate oxygen from air.

In numerous chemical processing, refinery, metal production and other industrial applications, purified gas streams are employed for a variety of processing purposes. For example, high purity oxygen is used in chemical processing, steel mills, paper mills, and in lead and gas production operations. Oxygen and nitrogen are produced from air, typically by cryogenic distillation for large size applications. While such cryogenic processing can be very efficient, particularly when conducted in large size plants, it nevertheless requires complex and costly equipment.

Vacuum swing adsorption/pressure swing adsorption processes have also been used to separate and purify gases, but the production of oxygen by the VSA/PSA approach has generally been confined to relatively small-sized operations with respect to which the use of cryogenic air separation may not be economically feasible. Many commonly available adsorbents, particularly the class of materials known as molecular sieves or zeolites, selectively adsorb nitrogen more strongly than oxygen, and this preferential adsorption is the basis of a variety of VSA/PSA processes that have been developed for the separation of air to produce oxygen and nitrogen product gas.

In the VSA/PSA process, a feed gas mixture, such as air, containing a more readily adsorbable component and a less readily adsorbable component, e.g., the nitrogen and oxygen components of air, is passed to the feed end of an adsorbent bed capable of selectively adsorbing the more readily adsorbable component at a higher adsorption pressure. Most of the less readily adsorbable component passes through the bed and is recovered from the discharge end of the bed. Thereafter, the bed is depressurized to a lower desorption pressure for desorption of the more readily adsorbable component, and its removal from the feed end of the bed prior to repressurization with feed gas and or less readily adsorbed component, and introduction of fresh feed gas for adsorption as cyclic adsorption-desorption-repressurization operations are continued in the bed. Such VSA/PSA processing is commonly carried out in multi-bed systems, with each bed employing the same VSA/PSA processing sequence on a cyclic basis interrelated to the carrying out of such processing sequence in the other beds of the adsorption system. In VSA/PSA systems for the recovery of moderate to high purity oxygen (80–95% $O_2$) product as the less readily adsorbable component of air, each adsorbent bed will commonly contain an adsorbent material capable of selectively adsorbing nitrogen as the more readily adsorbable component, with the selectively adsorbed nitrogen being subsequently desorbed and removed from the bed upon reduction of the pressure of the bed from the higher adsorption pressure level to a lower desorption pressure level. VSA/PSA systems for the recovery of nitrogen product have likewise been based on the use of adsorbents that selectively adsorb nitrogen from air as the more readily adsorbable component thereof.

There are various techniques that exist to separate nitrogen from oxygen. For instance, U.S. Pat. No. 4,329,158 to Sircar discloses a process for the separation of nitrogen from oxygen wherein a pretreatment adsorptive separation of water and carbon dioxide is performed prior to the bulk separation of the major constituents of air. Nitrogen enriched waste gas is utilized from the bulk separation portion of the process to regenerate the pretreatment portion of the process. The bulk separation of nitrogen from oxygen is performed with an elevated temperature adsorption of nitrogen, a desorption of bulk separation beds to a lower pressure, a purge of the beds with product oxygen after desorption countercurrently and two steps of repressurization to elevated pressure first with waste gas which is nitrogen enriched and secondly with product oxygen.

U.S. Pat. No. 5,882,380 to Sircar describes a single-bed PSA system comprising a blower, an adsorber vessel, and a gas product storage tank that separates a gas mixture using a three-step cycle comprising adsorption, evacuation, and pressurization used to separate nitrogen from a feed air. Pressurization is accomplished by introducing gas from the gas product storage tank into both the feed end and the product end of the adsorber vessel. Preferably a portion of the pressurization gas is introduced into the adsorber vessel by the blower, which also is used for providing feed to the adsorber and for withdrawing gas from the adsorber during the evacuation step.

Ackley et al. (European Patent Application No. 0 963 777) discloses a PSA apparatus for the separation of a heavy component from a light component in a feed stream. The apparatus includes an adsorbent bed comprising either a mixture of adsorbents or composite adsorbent particles wherein each particle comprises two or more adsorbents. At least one of the adsorbents is comparatively weak, i.e., NaX, and the other is comparatively strong, i.e., LiX. Another embodiment of the invention is a PSA prepurifier having a bed of adsorbent material which comprises a mixture of adsorbents, or composite of adsorbent particles wherein each particle comprises at least two adsorbents, at least one of the adsorbents being comparatively strong, i.e., NaY and at least another of the adsorbents being comparatively weak, i.e., activated aluminum.

The adsorbent is often the key to the effectiveness of oxygen production processes. Therefore, much attention has been given to the development, improvement and manufacture of adsorbents. For example, specialized zeolite adsorbents have been synthesized through ion exchange, lower Si/Al structures and improved activation procedures. These additional and/or improved manufacturing steps have resulted in higher costs for these specialized adsorbents (e.g., LiX) compared to more common adsorbents (e.g., 5A and 13X). In many processes, the adsorbent has become a significant fraction of the overall capital investment. Thus, there is considerable incentive to reduce the cost of the adsorbent if doing so results in an overall reduction in the cost of the desired product of the separation.

Accordingly, there is a need for alternative systems for separating oxygen from gas mixtures, such as air, wherein the systems optimize the productivity of relatively inexpensive adsorbents to render the systems economically competitive with state of the art systems employing more sophisticated but expensive adsorbents.

All references cited herein are incorporated herein by reference in their entireties.

BRIEF SUMMARY OF THE INVENTION

The invention provides a process for producing an oxygen enriched product from a feed gas containing oxygen and nitrogen. The process comprises: (a) providing a gas separation apparatus having at least one bed containing a physical mixture of at least two different nitrogen selective adsorbents, wherein the at least one bed is free of lithium cations; (b) feeding a feed gas containing oxygen and nitrogen into the gas separation apparatus to contact the at least one bed; and (c) recovering from the gas separation apparatus the oxygen enriched product. The process is preferably performed above ambient temperature and/or in a simplified four-step VSA/PSA cycle. The cycle includes: (a) feeding a feed gas containing oxygen and nitrogen into a gas separation apparatus to contact at least one bed of the apparatus with the feed gas, wherein the feed gas is at a temperature above ambient, e.g., from about 40° C. to about 100° C.; (b) countercurrently evacuating the at least one bed following the feeding; (c) countercurrently purging the at least one bed with the oxygen enriched product under vacuum; and (d) simultaneously pressurizing the at least one bed with a countercurrent stream of the oxygen enriched product and a cocurrent stream of the feed gas.

Also provided are an apparatus for performing the process of the invention and a process for producing an oxygen enriched product from a feed gas containing oxygen and nitrogen using the four-step cycle and elevated temperature with lithium-containing and/or lithium-free beds.

BRIEF DESCRIPTION OF SEVERAL VIEWS OF THE DRAWINGS

The invention will be described in conjunction with the following drawings wherein.

DETAILED DESCRIPTION OF THE INVENTION

Figure 1:
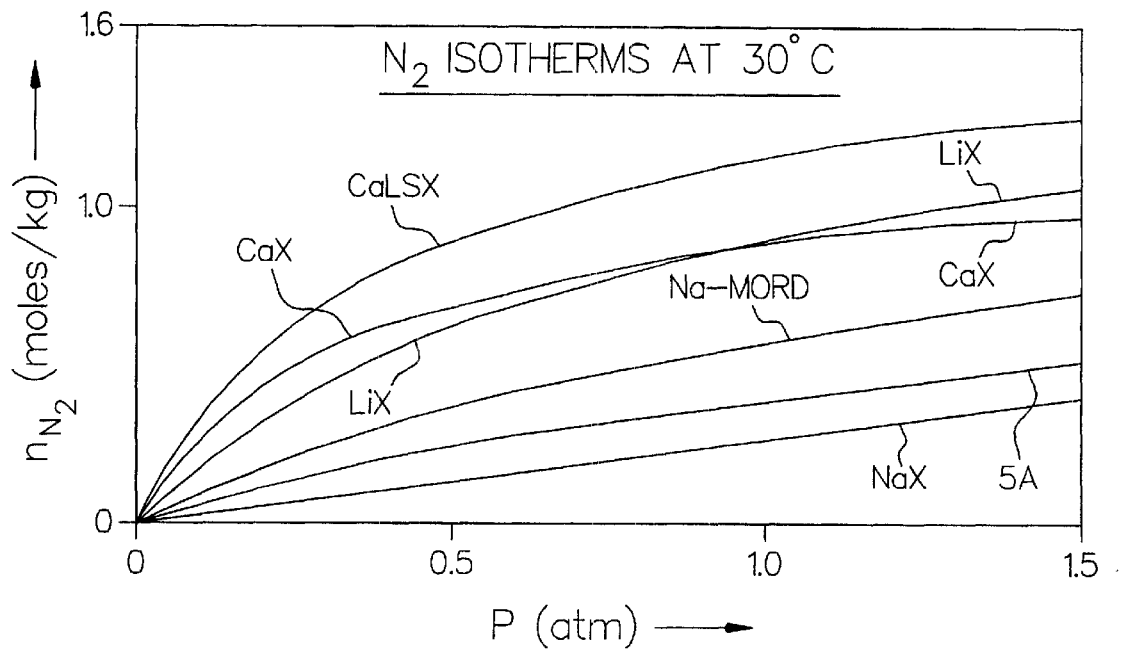
FIGS. 1, 2 and 3 are graphs of $N_2$ capacity versus adsorption pressure.

While various techniques exist to separate nitrogen from oxygen, the inventors are not aware of the use of mixed adsorbents in the adsorber column which completely exclude the use of a lithium exchange cation, and higher feed temperature, or simpler process designs.

There is a need for a vacuum swing adsorption/pressure swing adsorption (VSA/PSA) system and process that reduces the cost of adsorption processes. This need can be met by improving adsorbent efficiency and/or by reducing the cost of the adsorbent. Improved adsorbent efficiency means greater adsorbent effectiveness for the desired separation.

While conventional zeolite molecular sieves associated with lithium exhibit a highly desirable capacity and selectivity toward the adsorption of nitrogen from air, it has been found that less costly mixtures of at least two low to moderate nitrogen selective adsorbents, such as zeolites containing monovalent and divalent cations which include calcium, sodium, barium, strontium, magnesium, and cesium, can also be used for the desired selective adsorption of nitrogen from feed air, and the recovery of oxygen as the desired product gas at a reduced or comparable cost. Other low cost nitrogen selective zeolitic adsorbents suitable for use in the present invention are exchanged X, exchanged A, and mordenite zeolites, such as NaX, 5A, Na-Mordenite, CaX and CaLSX.

In preferred embodiments, the separation of nitrogen from oxygen is achieved through the use of a mixture of at least two different low to moderate nitrogen selective adsorbents mixed together. The term "mixture" as used herein means a physical intermixture of ingredients (e.g., a homogeneous blend of adsorbent particles) as opposed to a heterogeneous assembly of ingredients (e.g., layers of different adsorbents) inside the adsorber. The mixture can be a composite of adsorbent particles or a mixture of independent adsorbent particles. The mixture preferably contains from about 20% to about 80% by weight of a first adsorbent and from about 80% to about 20% by weight of a second adsorbent. The mixture more preferably contains about 50% by weight of each of the two adsorbents. It has been found that the use of mixed adsorbents, instead of a single adsorbent, can produce oxygen at a competitive cost.

The mixture is preferably free of lithium ion exchanged zeolites, such as LiX. Accordingly, the bed is preferably free of lithium cations.

Additionally, it has been found that the use of a higher feed air temperature than ambient, e.g., from about 400° C. to about 100° C., can significantly alter the air separation process performance in order to produce cost-competitive oxygen product using relatively inexpensive adsorbents. This method can also be used in conjunction with a relatively simple process design (i.e., a four-step cycle), which results in a single adsorber, single air blower-vacuum pump combined system which produces oxygen at a competitive cost.

The invention will be illustrated in more detail with reference to the following Examples, but it should be understood that the present invention is not deemed to be limited thereto.

EXAMPLES

Simulations were performed to study the cost of $O_2$ production by VSA using pure gas adsorption data for $N_2$ and $O_2$ on various zeolites. The relative costs were developed for a 60 TPD contained $O_2$ unit producing 90–92% $O_2$ at a pressure of 10 psig. The inventors evaluated the process performance of (a) several single zeolites (NaX, CaX, 5A, Na-mordenite, CaLSX and LiX), (b) several mixed zeolites (LiX+NaX, CaX+NaX) where an intimate mixture of zeolites at the particle level (not layered) was used, and (c) operating the VSA-$O_2$ process using a hot feed air in order to raise the average adsorbent temperature during the process steps. The commonly used eight-step VSA $O_2$ process (minimum two beds) as well as a simpler four-step VSA-$O_2$ process using a single bed and a single air blower/vacuum pump combination were evaluated.

As a result of this evaluation, it was determined that LiX zeolite offers the best performance for $O_2$ production under commonly used VSA-$O_2$ process design conditions (highest $O_2$ productivity and lowest power) due to its high $N_2$ working capacity and selectivity and low $N_2$ Henry's Law constant and that the performance advantage of LiX zeolite is compromised by its relatively higher cost. All other zeolites yielded competitive $O_2$ product costs when used with the commonly used VSA-$O_2$ process because of their relatively lower costs. It was also determined that a mixed adsorbent system allows alteration of effective $N_2$ and $O_2$ adsorption characteristics by design, which in turn provides large flexibility in process performance. These systems are also cost competitive with LiX based systems.

Table 1 illustrates examples of the adsorptive properties of various ion-exchanged zeolites of different framework structures (commercially developed) used for practical air separation processes. High nitrogen working capacity, high nitrogen selectivity over oxygen, and low heat of adsorption of nitrogen generally lower the specific adsorbent inventory for a given oxygen production capacity and give higher oxygen recovery from the feed air. Lower Henry's Law constants for nitrogen and lower heats of adsorption for $N_2$ generally reduce the evacuation power for desorption of $N_2$ in a VSA-$O_2$ process.

Table 1 lists adsorbents in chronological order of development of zeolites for air separation. The $N_2$ working capacity increases and then levels off, the selectivity of adsorption of $N_2$ over $O_2$ increases and then levels off, and the heat of adsorption of $N_2$ increases and then levels off. On the other hand, the Henry's Law constant for $N_2$ increases and then decreases for LiX. Thus, LiX is currently the preferred material for production of $O_2$ because it provides the most desired properties. However, LiX is also the most expensive adsorbent listed.

TABLE 1

| Example No. | Adsorbent | Relative Cost $/lb | $N_2$ Working Capacity moles/kg | $N_2/O_2$ Selectivity | $N_2$ Isosteric Heat Kcal/mole | $N_2$ Henry's Law Constant moles/-kg/atm |
| --- | --- | --- | --- | --- | --- | --- |
| 1 | NaX | 1.00 | 0.110 | 2.9 | 4.3 | 0.297 |
| 2 | 5A | 1.07 | 0.170 | 3.8 | 5.7 | 0.522 |
| 3 | Na-Mordenite | 2.67 | 0.216 | 4.0 | 6.2 | 0.982 |
| 4 | CaX | 1.27 | 0.252 | 10.9 | 7.1 | 3.606 |
| 5 | CaLSX | 2.33 | 0.387 | 12.7 | 6.9 | 4.033 |
| 6 | LiX | 3.70 | 0.342 | 10.2 | 6.7 | 1.982 |

*Isothermal $N_2$ working capacity at 30° C.
Adsorption of air at 1 atm
Evacuation to 0.3 atm The performance of a commonly used VSA-$O_2$ process for production of 90–92% oxygen from ambient air using the zeolite adsorbents of Table 1 was simulated using experimentally measured $N_2$ and $O_2$ adsorption characteristics on these materials. The commonly used VSA-$O_2$ process consisted of eight cyclic steps: (a) feed air flow with $O_2$ enriched product withdrawal, (b) feed air flow to provide $O_2$ enriched purge gas, (c) cocurrent depressurization to provide purge gas, (d) cocurrent depressurization to provide pressurization gas, (e) countercurrent evacuation, (f) countercurrent purge with $O_2$ enriched gas under vacuum, (g) countercurrent pressurization with $O_2$ enriched gas and (h) cocurrent feed pressurization.

Table 2 shows the simulated separation performances for different zeolites. It may be seen that the $O_2$ productivity (mlb moles of $O_2$ produced/lb of zeolite/cycle) and the specific power for the product (KW/TPD contained $O_2$) substantially vary from zeolite to zeolite, but the relative costs of oxygen product ($/ton) is very insensitive to the choice of the adsorbents.

The results in Table 2 illustrate that the LiX zeolite has the highest oxygen production capacity and the lowest power requirement, but its higher price compromises these apparent advantages to give similar oxygen cost as other zeolites. Also, as evidenced by Table 2, other materials, such as NaX or CaX, compete well with LiX because they are less expensive than LiX.

TABLE 2

| Example No. | Adsorbent | $O_2$ Productivity (mlb moles/lb/cycle) | $O_2$ Recovery (%) | Relative Specific Power* (KW/TPDc) | Relative $O_2$ Cost |
| --- | --- | --- | --- | --- | --- |
| 1 | LiX | 0.0597 | 70.0 | 1.00 | 1.00 |
| 2 | NaX | 0.0304 | 52.5 | 1.18 | 1.04 |
| 3 | CaX | 0.0371 | 59.4 | 1.18 | 1.03 |
| 4 | CaLSX | 0.0495 | 64.8 | 1.09 | 1.01 |

*Adsorption Pressure = 1.35 atm,
Final Desorption Pressure = 0.323 atm
Feed Temperature = 97° F., Product compressed to 10 psig The inventors noted that even though $N_2$ adsorption isotherms are strikingly different on these zeolites (as shown by FIG. 1), such disparity in isotherm shapes does not create any meaningful difference in the $O_2$ production cost using today's zeolite cost structure.

The above unexpected results led the inventors to invent (a) several different ways of altering the $N_2$ and $O_2$ adsorption isotherm shapes and thereby obtain $O_2$ production costs which are competitive with the current cost for the commonly used VSA-$O_2$ process using the LiX adsorbent, and (b) several different ways of operating simpler and less capital intensive VSA-$O_2$ processes than the present complex VSA process in order to match the current cost of $O_2$ production.

First, the inventors discovered that the effective shapes of $N_2$ and $O_2$ adsorption isotherms can be altered by design using a packed bed of intimately mixed (not layered) particles of two or more different zeolites. This will introduce a synthetic adsorbent heterogeneity and change the effective adsorption isotherms, $N_2$ selectivities over $O_2$ and heats of adsorption for the air separation process. For example, the pure gas adsorption isotherms of a composite adsorbent bed will be given by the weighted averages [(weight % of a type) X (adsorption capacity of that type)] of the isotherms of each type of adsorbent present in the mixture.

Figure 2:
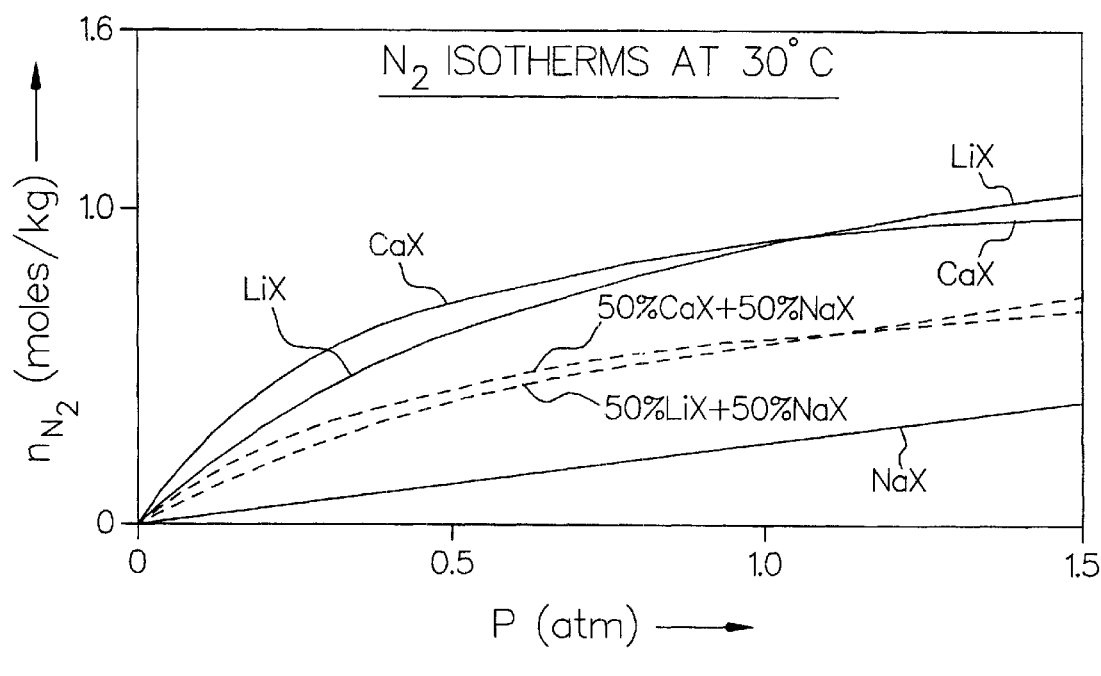

FIG. 2 shows the composite $N_2$ isotherms for 50% LiX+ 50% NaX and 50% CaX+50% NaX mixtures. As illustrated in FIG. 2, drastic changes in isotherm shapes can be created (compared to single adsorbents) by mixing different adsorbents. It was also observed that the corresponding unit cost of the mixed adsorbent is significantly less than that of single adsorbents.

Table 3 illustrates the simulated performance of a commonly used VSA-$O_2$ process using the above described mixed adsorbents. The operating conditions of the processes are the same as those used for generating the data of Table 2. It may be seen that even though the mixed gas adsorbents exhibit lower $O_2$ productivity and higher specific power, the $O_2$ production cost is comparable with that of LiX due to the less expensive cost of NaX and CaX zeolites.

TABLE 3

| Example-No. | Adsorbent | $O_2$ Productivity (mlb-moles/lb/cycle) | $O_2$ Recovery (%) | Relative Specific Power* (KW/TPDc) | Relative $O_2$ Cost |
|---|---|---|---|---|---|
| 1 | LiX | 0.0597 | 70.0 | 1.00 | 1.00 |
| 2 | 50% LiX + 50% NaX | 0.0491 | 65.0 | 1.02 | 0.99 |
| 3 | 50% CaX + 50% NaX | 0.0353 | 57.3 | 1.16 | 1.02 |

*Same operating conditions as those for Example 2.

Secondly, the inventors have discovered that the shapes of the $N_2$ and $O_2$ adsorption isotherms can also be altered by changing the effective adsorbent temperature within the adsorbers during the air separation process steps. This can be achieved by increasing the feed air temperature above ambient, e.g. from about 40° C. to about 100° C.

Figure 3:
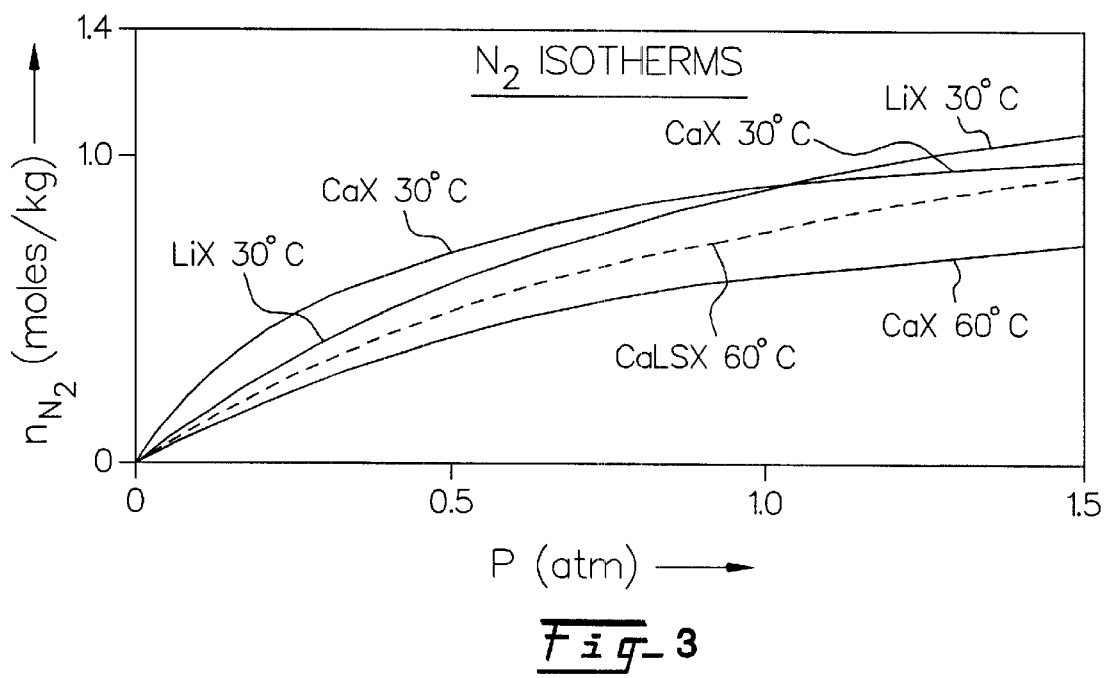

FIG. 3 shows the $N_2$ adsorption isotherm of CaLSX zeolite at 140° F. (60° C.) and compares it with the $N_2$ isotherm of LiX at 30° C. As illustrated by FIG. 3, the Henry's Law constant of CaLSX becomes similar to that of LiX (30° C.) at 60° C. Table 4 demonstrates the performance of a commonly used VSA-$O_2$ process at 140° F. (60° C.) feed temperature using CaLSX. CaLSX is a highly nitrogen selective binderless exchange X zeolite adsorbent. At a temperature above ambient, e.g., from about 40° C. to about 100° C., the inventors discovered that the process performance and $O_2$ costs of CaLSX are comparable with those for LiX.

TABLE 4

| Example No. | Adsorbent | Feed Gas Temperature (° F.) | $O_2$ Productivity (mlbmoles/lb/cycle) | $O_2$ Recovery (%) | Relative Specific Power* (KW/TPDc) | Relative $O_2$ Cost |
|---|---|---|---|---|---|---|
| 1 | LiX | 97.0 | 0.0597 | 70.0 | 1.00 | 1.00 |
| 2 | CaLSX | 140.0 | 0.0557 | 68.9 | 1.03 | 0.98 |
| 3 | 50% CaX + 50% NaX | 140.0 | 0.0339 | 58.0 | 1.16 | 1.03 |

*Same operating conditions as used for the cases of Table 2 except the feed gas temperature.

The data in Table 4 indicate that the effective $N_2$ and $O_2$ adsorption characteristics can also be altered by using higher temperature (above ambient) air feed to the VSA-$O_2$ system. This approach can be used to obtain process performance which is very similar to that for LiX by using less expensive adsorbents. This option may be particularly attractive because the currently required feed gas cooling step after the air blower used in a single bed VSA system using a highly selective nitrogen adsorbent can be eliminated.

Additionally, concepts described above in Tables 3 and 4 (i.e., intimately mixed adsorbents and high feed temperature) can be used in conjunction with a simpler VSA cycle which eliminates the need for the use of multiple beds. Thus, a single bed, single blower-vacuum pump combination can make the process simpler yet cost effective. The impact of changing materials and process design on the cost of $O_2$ product are not significant partly because (a) higher $O_2$ productivity generally accompanied by higher power which compensate each other and (b) adsorbents which give better performance are also more expensive which neutralizes the performance advantage. Thus, less expensive commercial adsorbents can be used for competitive $O_2$ cost production when used with a discreet process design.

A concept for economic production of 80–95% oxygen from air was developed by using a VSA process cycle where a combination (physical mixture or composite) of two or more nitrogen selective adsorbents (having low to moderate nitrogen adsorption selectivity and capacity) used in conjunction with a variety of process cycle designs and elevated air feed gas temperatures. The net oxygen product costs from such a system is lower than or equivalent to that obtained by using an expensive high performance adsorbent, such as LiX, with high nitrogen adsorption selectivity and capacity.

The above described use of mixed adsorbents with or without higher feed air temperature in changing the effective shape of the $N_2$ and $O_2$ isotherms can also be used in conjunction with simple (four-step cycle) VSA-$O_2$ processes for lowering the cost of $O_2$ production. The eight-step commonly used VSA-$O_2$ process requires at least two parallel adsorbent beds in tandem in order to provide the internal purge and pressurization gases. The simpler four-step VSA-$O_2$ process for producing an $O_2$ enriched product comprises: (a) feeding a feed gas (preferably air) into a PSA or VSA bed; (b) countercurrent evacuation of said bed, (c) countercurrent purge of said bed with $O_2$ product under vacuum, and (d) simultaneous pressurization of said bed with $O_2$ product (countercurrent) and feed air (cocurrent). This simpler four-step cycle process can be operated using a single adsorber and a single combined-air blower and vacuum pump at a lower capital cost, because there are no steps where gas communication between two adsorbers are needed.

Table 5 shows the comparative performance of the above described simpler four-step cycle VSA-$O_2$ using CaX zeolite at a feed air temperature of 140° F. (60° C.). The $O_2$ production costs is very competitive with that for the commonly used VSA-$O_2$ process using LiX zeolite.

TABLE 5

| Ex. No. | Process | Adsorbent | Feed Gas Temperature (° F.) | $O_2$ Productivity (mlbmoles/lb/cycle) | $O_2$ Recovery (%) | Relative Specific Power* (KW/TPCd) | Relative $O_2$ Cost |
|---|---|---|---|---|---|---|---|
| 1 | Commonly Used VSA* (8 step cycle) | LiX | 97.0 | 0.0597 | 70.0 | 1.00 | 1.00 |

TABLE 5-continued

| Ex. No. | Process | Adsorbent | Feed Gas Temperature (° F.) | O$_2$ Productivity (mlbmoles/ lb/cycle) | O$_2$ Recovery (%) | Relative Specific Power* (KW/TP Cd) | Relative O$_2$ Cost |
|---|---|---|---|---|---|---|---|
| 2 | Simple-VSA** (4-step cycle) | CaX | 140.0 | 0.0337 | 41.3 | 1.43 | 1.026 |
| 3 | Simple-VSA** (4-step cycle) | 50% CaX + 50% NaX | 97.0 | 0.0317 | 40.9 | 1.39 | 1.04 |
| 4 | Simple-VSA** (4-step cycle) | 50% CaX + 50% NaX | 140.0 | 0.0291 | 40.2 | 1.36 | 1.06 |

*Same operating conditions as those for Table 2.
**Adsorption pressure = 1.35 atm
Final desorption pressure = 0.40 atm The above demonstrates that N$_2$ and O$_2$ adsorption isotherms for air separation can be manipulated in various ways by using mixed adsorbents and/or using higher feed air temperature in order to produce a cost effective O$_2$ product which is competitive with the commonly used VSA O$_2$ process using LiX zeolite as the adsorbent. This is a surprising result. The flexibility created by the choice of pure or mixed adsorbents and operating conditions can also be utilized with a simpler four-step cycle VSA-O$_2$ process which can be operated using a single adsorber and a single air blower-vacuum pump combination which also results in a competitive oxygen cost.

The above described results also show that many commercially available and less expensive adsorbents, such as NaX, CaX, and 5A, or their combinations in conjunction with many different VSA-O$_2$ processes of simpler designs and operating protocols can be used to produce an O$_2$ product which competes well with the commonly used VSA-O$_2$ process costs.

The present invention has been set forth with regard to several preferred embodiments, however the full scope of the present invention should be ascertained from the claims which follow.

What is claimed is:

1. A process for producing an oxygen enriched product from a feed gas containing oxygen and nitrogen, said process comprising:
   providing a gas separation apparatus comprising at least one bed containing a physical mixture of at least two different nitrogen selective adsorbents, wherein said at least one bed is free of lithium cations;
   feeding said feed gas into said gas separation apparatus to contact said at least one bed; and
   recovering from said gas separation apparatus said oxygen enriched product.

2. The process according to claim 1, wherein said feed gas is air.

3. The process according to claim 1, wherein said mixture is a composite of adsorbent particles or mixture of independent adsorbent particles.

4. The process according to claim 1, wherein said mixture is a homogeneous mixture of adsorbent particles.

5. The process according to claim 1, wherein one of said two different nitrogen selective adsorbents is a zeolite.

6. The process according to claim 5, wherein said zeolite contains a monovalent cation or a divalent cation.

7. The process according to claim 1, wherein said two different nitrogen selective adsorbents are two different members selected from the group consisting of sodium, calcium, barium, strontium, magnesium, cesium, exchanged X zeolite, exchanged A zeolite, and mordenite zeolite.

8. The process according to claim 7, wherein said mixture contains about 50% by weight of each of said two different nitrogen selective absorbents.

9. The process according to claim 1, wherein said mixture contains from about 20% to about 80% by weight of a first of said two different nitrogen selective adsorbents, and from about 80% to about 20% by weight of a second of said two different nitrogen selective adsorbents.

10. The process according to claim 1, further comprising providing said feed gas at a temperature above ambient.

11. The process according to claim 10, wherein said temperature is from about 40° C. to about 100° C.

12. The process of claim 1, further comprising:
   countercurrently evacuating said at least one bed following said feeding;
   countercurrently purging said at least one bed with said oxygen enriched product under vacuum; and
   simultaneously pressurizing said at least one bed with a countercurrent stream of said oxygen enriched product and a cocurrent stream of said feed gas.

13. The process according to claim 12, further comprising providing said feed gas at a temperature above ambient.

14. The process according to claim 13, wherein said temperature is from about 40° C. to about 100° C.

15. The process of claim 1, wherein said gas separation apparatus further comprises a single combined air blower-vacuum pump as a sole air blower and/or vacuum pump in said apparatus, and wherein there is only one bed in said apparatus.

16. A gas separation apparatus comprising:
   at least one bed containing a physical mixture of at least two different nitrogen selective adsorbents, wherein said at least one bed is free of lithium cations;
   a feed gas inlet to a feed end of said bed; and
   a product gas outlet from a product end of said bed.

17. The gas separation apparatus of claim 16, further comprising a single combined air blower-vacuum pump as a sole air blower and/or vacuum pump in said apparatus, wherein there is only one bed in said apparatus.

* * * * *